(12) United States Patent
Tenerelli et al.

(10) Patent No.: US 9,625,712 B1
(45) Date of Patent: Apr. 18, 2017

(54) OCCULTER FOR EXOPLANET EXPLORATION

(71) Applicant: Lockheed Martin Corporation, Bethesda, MD (US)

(72) Inventors: Domenick Joseph Tenerelli, Morgan Hill, CA (US); Sean Patrick McCully, Dublin, CA (US); David Putnam, La Honda, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 789 days.

(21) Appl. No.: 13/937,111

(22) Filed: Jul. 8, 2013

Related U.S. Application Data (63) Continuation of application No. 12/708,626, filed on Feb. 19, 2010, now Pat. No. 8,480,241.

(60) Provisional application No. 61/153,920, filed on Feb. 19, 2009.

(51) Int. Cl.
| | |
|---|---|
| *G02B 27/00* | (2006.01) |
| *H01Q 15/16* | (2006.01) |
| *B64G 1/22* | (2006.01) |
| *G02B 5/00* | (2006.01) |

(52) U.S. Cl.
CPC ............ *G02B 27/00* (2013.01); *B64G 1/222* (2013.01); *G02B 5/005* (2013.01); *H01Q 15/161* (2013.01)

(58) Field of Classification Search
CPC . G02B 1/00; G02B 5/00; G02B 5/003; G02B 5/02; G02B 5/021; G02B 5/0236; G02B 5/0273; G02B 5/0294; G02B 7/00; G02B 7/003; G02B 7/006; G02B 7/20; G02B 7/22; G02B 7/24; G02B 23/00; G02B 23/16; G02B 23/20; G02B 23/2476; G02B 5/005; H01Q 15/161; B64G 1/222
See application file for complete search history.

(56) References Cited

U.S. PATENT DOCUMENTS

| | | | |
|---|---|---|---|
| 4,315,265 A | * | 2/1982 | Palmer ................. F24J 2/12 343/840 |
| 4,561,614 A | | 12/1985 | Olikara et al. |
| 5,069,529 A | | 12/1991 | Takahashi |
| 5,898,529 A | * | 4/1999 | Meyer ................ G02B 23/00 343/781 P |
| 6,191,757 B1 | | 2/2001 | Bassily et al. |
| 6,199,988 B1 | | 3/2001 | Krawczyk |
| 6,361,614 B1 | | 3/2002 | Chung et al. |
| 6,647,668 B1 | | 11/2003 | Scheir et al. |

(Continued)

OTHER PUBLICATIONS

W. Cash, "Detection of Earth-like planets around nearby stars using a petal-shaped occulter," Letters—Nature, Jul. 6, 2006, pp. 51-53, vol. 442, Nature Publishing Group.

(Continued)

*Primary Examiner* — Thong Nguyen
(74) *Attorney, Agent, or Firm* — McDermott Will & Emery LLP (57) ABSTRACT

A method of deploying a space based occulter is provided. The occulter comprises a base portion and a blanket section extending radially from the base portion. A plurality of starlight blocking petals are attached to the base portion and attached to the blanket section, the petals extending radially from the base portion, each of the petals being hingedly connected to an adjacent petal.

15 Claims, 6 Drawing Sheets

(56) References Cited

U.S. PATENT DOCUMENTS

| | | | |
|---|---|---|---|
| 8,167,247 B2* | 5/2012 | Daily | G02B 5/005 244/158.1 |
| 2008/0180802 A1 | 7/2008 | Cash | |
| 2011/0242663 A1 | 10/2011 | Daily et al. | |

OTHER PUBLICATIONS

W. Cash, "Final Report—Astrophysics Strategic Mission Concept Study—The New Worlds Observer," NOW ASMCS Final Report, Apr. 24, 2009, pp. 1-20.

* cited by examiner

| SOURCE | VALUE (in) | VALUE (mm) |
|---|---|---|
| MANUFACTURING | 0.005 | 0.127 |
| 1-g TO 0-g | 0.005 | 0.127 |
| DYNAMIC | 0.005 | 0.127 |
| THERMAL | 0.005 | 0.127 |
| DEPLOYMENT | 0.007 | 0.178 |
| ASSEMBLY | 0.010 | 0.254 |
|  |  |  |
| TOTAL (RSS) | 0.016 | 0.401 |

← 0.5 mm REQ.

OCCULTER FOR EXOPLANET EXPLORATION

CROSS-REFERENCES TO RELATED APPLICATIONS

The present application is a continuation of U.S. patent application Ser. No. 12/708,626, entitled "Occulter for Exoplanet Exploration," filed Feb. 19, 2010, now U.S. Pat. No. 8,480,241, which claims the benefit of priority under 35 U.S.C. §119 from U.S. Provisional Patent Application Ser. No. 61/153,920, entitled "Occulter for Exoplanet Exploration," filed on Feb. 19, 2009, the disclosures of all of which are hereby incorporated by reference in their entirety for all purposes.

BACKGROUND OF INVENTION

In the field of exoplanet exploration, it is desirable to determine if there are planets orbiting about distant stars. Doppler detection has been used to detect planets orbiting some stars, but direct imaging is desired. Pointing a telescope at a star and its vicinity will not necessarily reveal whether that star is being orbited by planets or the number of planets. The starlight hampers the ability to discern orbiting planets in its vicinity. Accordingly, it is desirable to block out star light to determine planets rotating about that star.

Exploration of distant planets involves using powerful telescopes and orbiting space telescopes, such as the Hubble Space Telescope. In those instances, the problem of how to mask or block out starlight to directly image orbiting planets calls for unique solutions. Various proposals have been made that incorporate the use an occulting shield outside the telescope. An example of one such proposal can be found in *Detection of Earth-like Planets Around Nearby Stars Using a Petal-Shaped Occulter*; by Webster Cash; *Nature*, Vol. 442, 6 Jul. 2006. Therein a free flying occulter is proposed. However, how an occulter is manufactured and deployed in space, while maintaining the desired function is not addressed.

Accordingly it desirable to deploy and use a large on-orbit deployable shield or occulting mask to block out starlight to directly image orbiting planets.

SUMMARY OF THE INVENTION

A space based occulter is provided. It comprises a base portion and a blanket section extending radially from the base portion. A plurality of starlight blocking petals are attached to the base portion and attached to the blanket section, the petals extending radially from the base portion, each of the petals being hingedly connected to an adjacent petal.

A starlight blocking petal for a spaced based occulter is provided. It comprises a petal frame having a light diffusing outer perimeter edge and a structural frame connected to the petal frame. The structural frame has a perimeter including outer edge portions extending between an outer end and an inner end, and a longitudinally extending center stringer interposed between the outer end and the inner end. At least one light blocking panel is attached to the structural frame.

A method of deploying a space based occulter from a stowed position to a deployed position is provided. It comprises providing a plurality of petals in a first plane and attached to a base, the base having at least one portion in a second plane. Each of the plurality of petals lays flat against an adjacent petal in the stowed position, each of the petals being hingedly connected to an adjacent petal. The method comprises extending at least two of the petals away from the base and rotating the at least two petals from the first plane in the stowed position to the deployed position which is generally parallel to the second plane. A blanket section having an interior edge attached to the base and an exterior edge attached to the plurality of petals is drawn from a stowed position at the base to the deployed position generally parallel to the second plane.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, the disclosure herein is directed to a large free flying occulter or light shield 10. When paired with a large space telescope, direct observation of planets around nearby and distant stars will be possible, including those not detected by Doppler techniques. Of course, it may be possible to use earth-bound telescopes in conjunction with occulter 10, and the invention described herein should not be seen as limited to use with space telescopes. In practice the occulter is positioned in space at a distance from the space telescope (not shown) and interposed in direct axially alignment between the telescope and the star. The occulter 10, exceeding 40 meters in diameter in an exemplary embodiment, provides an effective shield to prevent light from the target star from interfering with the view from the telescope—with very little light scatter to interfere with direct imaging. As a consequence, reflected light from the star on orbiting planets can be directly imaged through the telescope.

The occulter 10 disclosed herein is completely modular and capable of being launched from earth in, for example, an Atlas rocket. Once arriving at a distant location in space, the occulter 10 is capable of deploying in a controlled manner, will block or diffuse light in the central axial region stretching between the occulter 10 and the telescope and is dimensionally stable in extreme temperature conditions.

Figures 1, 2:
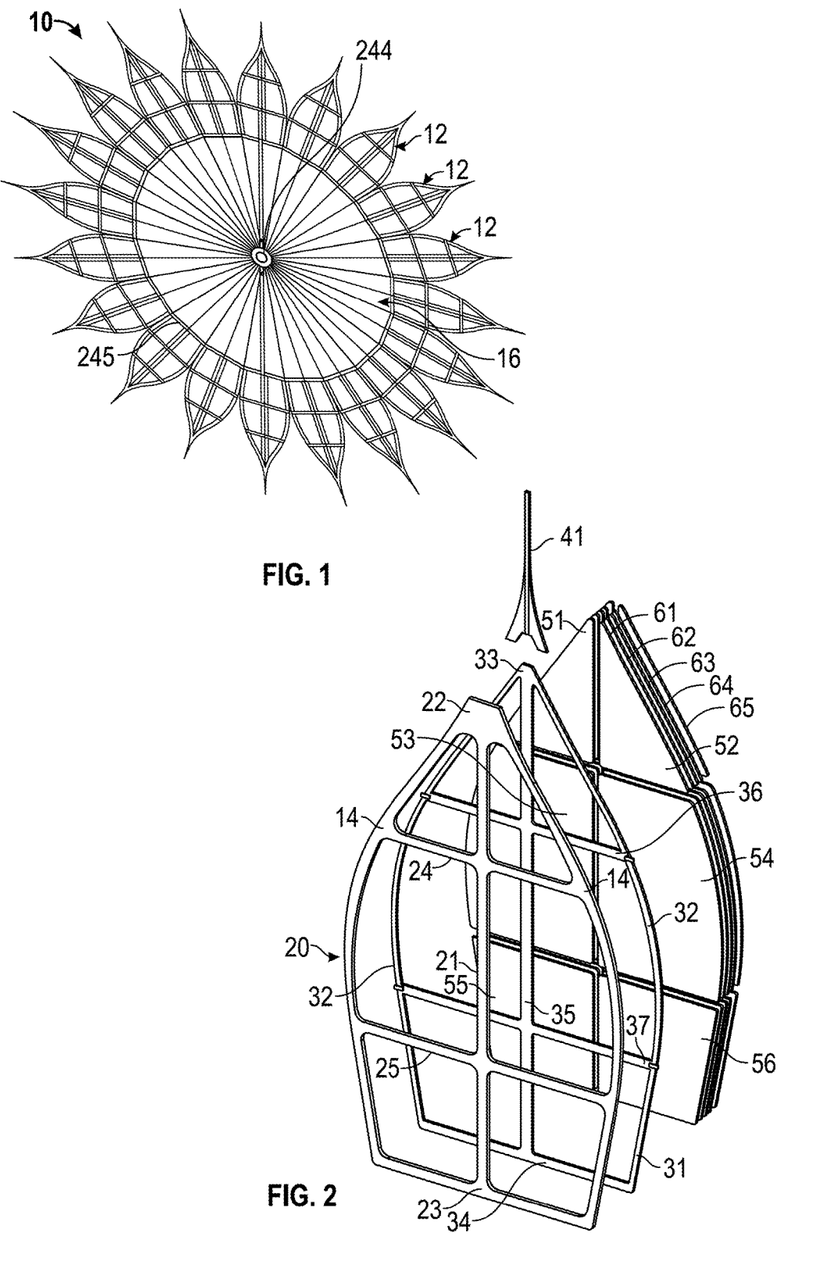
FIG. 1 illustrates an occulter according to the invention.
FIG. 2 is an exploded view showing one aspect of the invention.

As shown in FIG. 1, occulter 10 is comprised of rigid multiple petal shaped plates 12, each having a two precisely shaped outer surface occulting edges 14 to diffuse and scatter light. As used herein, the term petal refers to any shape that has the ability to diffuse light by providing a transmission profile that directs light waves away from a radial center of the petal. As shown in the nonlimiting embodiment herein, the petal is a generally a two dimensional rigid plate having opposite outer radial edges of the petals that, when viewed in plan view, have alternating concave and convex shaper meeting at an outer radial tip. Additionally the edge surface has a curvature between opposite flat panel sides of petal plates 12 that contributes to light diffusion. It will of course be realized from the description herein that the design disclosed can be used with any even-number of petals and with any alternate outer surface occulting edges 14.

Light diffraction from the petal shape outer surface edges 14 combines with an interior portion including petals 12 and a center blanket section 16, that creates the dark central region that extends axially from the central region through space to the telescope. In the exemplary embodiment shown, the center blanket section 16 is comprised of Kapton layers supported by the deployed rigid petals, as will be described in detail herein below. It may occur to others to substitute other materials for Kapton. Such substitution is within the scope of the invention.

The outer surface occulting edges 14 of each petal 12 are manufactured to a precise radial and dimensional tolerance to properly prevent light from bending around the surface and scatter light from the center blanket region 16.

As best seen in FIG. 2, each petal 12 is comprised of a petal frame 20 which in an exemplary embodiment, is a graphite epoxy composite for low coefficient of thermal expansion (CTE) properties. Petal frame 20 is defined by the arcuate outer surface occulting edges 14 on opposite sides of a center stringer 21 extending between a radially outer edge 22 and an inner perimeter edge 23 of petal frame 20. In the exemplary embodiment shown, two ribs 24, 25 extend generally orthogonal to stringer 21 and between opposed occulting edges 14.

A structural frame 31, and in the non-limiting embodiment shown, a graphite epoxy tubular frame 31 having the same CTE properties as petal frame 20 is provided. Tubular frame 31 is generally a mirror image, and in the exemplary embodiment shown, slightly smaller than petal frame 20. Tubular frame 31 includes outer arcuate tubular sections 32 extending between outer end or outer radial tubular section 33 and inner tubular perimeter section 34. A center stringer tube 35 intersects outer radial tubular section 33 and inner tubular perimeter section 34 and two tubular ribs 36, 37 intersect stringer tube 35 as ribs 36, 37 extend between outer tubular sections 32. A frame tip 41 having arcuate edges like those on outer surface occulting edges 14 is fastened to outer radial tube section 33. In the exemplary embodiment shown, petal frame 12 is about 10 meters in length, when measured from frame tip 41 to the outside edge of inner tubular perimeter section 34. It will be appreciated that other dimensions are contemplated, another exemplary embodiment being described herein with reference to FIG. 3.

In the exemplary embodiment shown in FIG. 2, six Kapton panels 51, 52, 53, 54, 55 and 56 are manufactured and mechanically attached or bonded, such as by glue, fasteners or other known means, to tubular frame 31. Each of panels 51-56 is comprised of five sections. The sections, in successive order, are: a double aluminized first Kapton layer 61 (0.5 mils thick in an embodiment) which is bonded to an outer surface of a first Kapton frame 62, a second double aluminized Kapton layer 63 which is bonded on one side to the first Kapton frame 62 and bonded on a second side to a second Kapton frame 64, and a third double aluminized Kapton layer 65 which is bonded to the outer surface of the second Kapton frame 64.

It will be appreciated that the construction of Kapton panels 51-56 provides three layers of Kapton material for meteorite or micro-meteoroid protection through the occulter 10 area. Each layer 61, 63 and 65 has a void space therebetween in a dimension that is generally the thickness of the Kapton frame 62, 64, which acts as a spacer between layers 61, 63 and 65. Each Kapton layer 61, 63, 65 provides added insurance that a micro-meteoroid will not penetrate all three layers 61, 63 and 65 and thus prevents light from penetrating through the occulter 10. However, even if each Kapton layer 61, 63, 65 is penetrated by a single micro-meteoroid, multiple layers prevent light from travelling in a path different from that of the micro-meteoroid. So long as the micro-meteoroid did not penetrate Kapton layers 61, 63 and 65 in a path generally axially aligned with path between a telescope and the star being studied, the light caused by the micrometeoroid penetration will not be visible to the telescope.

Figure 5:
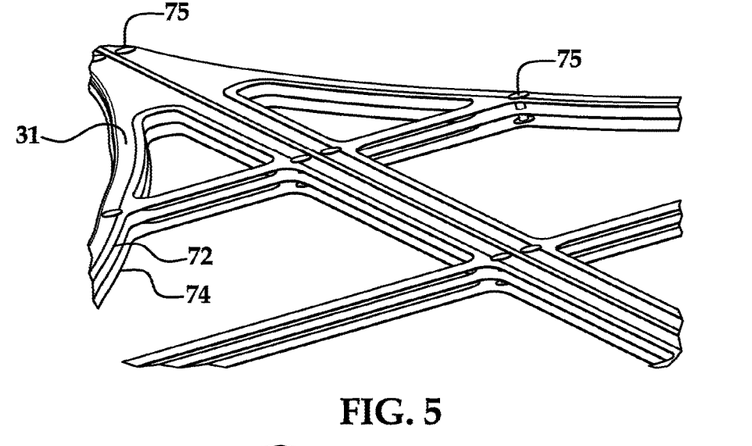
FIG. 5 is detail view showing an alternative embodiment to FIG. 2.

In alternative embodiment to that shown in FIG. 2, FIG. 5 discloses a first petal Kapton frame 72 and second petal Kapton frame 74 attached to graphite tubular frame 31 via mechanical attachment, such bolts 75 shown. First, second and third Kapton layers 61, 63 and 65 (not shown in FIG. 5) are layered over petal Kapton frames 72 and 74 in manner similar to that shown in FIG. 2 relative to individual Kapton panels 51-56. The alternative construction of FIG. 5 provides a single sheet of Kapton over an entire half of petal 12, instead of the individual panel concept of FIG. 2.

Figure 3:
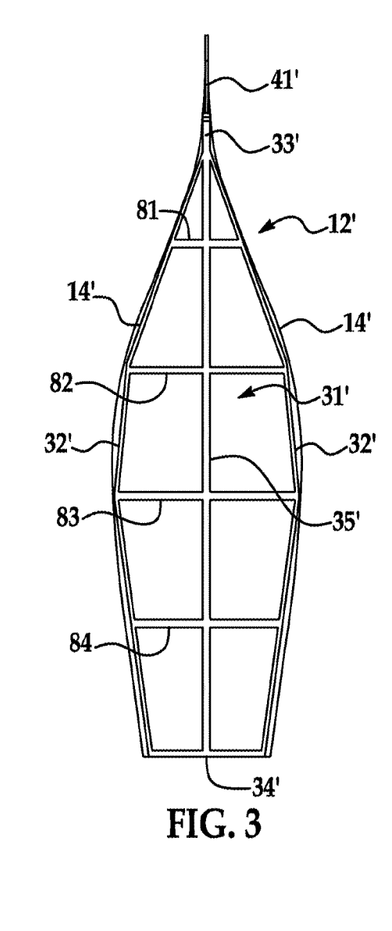
FIG. 3 is schematic illustration showing an alternative embodiment of one aspect of the invention.

Referring now to FIG. 3, an alternative structural arrangement of a petal 12' is shown. Like petal frame 20, petal frame 20' has an outer surface occulting edge 14' that forms the outer perimeter of petal 12'. The remainder of the structural frame, such as a graphite structural frame 31' is interior of occulting edge 14' so as not to interfere with the light defraction of the petal shape. In the embodiment shown, tubular frame 31' has an outer tubular sections 32', and outer radial tube section 33' and an inner tubular perimeter section 34'. A center stringer tube 35' extends between outer radial tube section 33' and inner tubular perimeter section 34'. The embodiment shown includes ribs 81, 82, 83 and 84. Additional ribs provide additional structural rigidity if the dimension of petals 12 is changed or allows petals to be formed of different shapes and dimensions. A frame tip 41' is included in petal frame 12'. In the exemplary embodiment shown, petal frame 12' is about 14 meters in length, when measured from frame tip 41' to the outside edge of inner tubular perimeter section 34'.

Figure 4A:
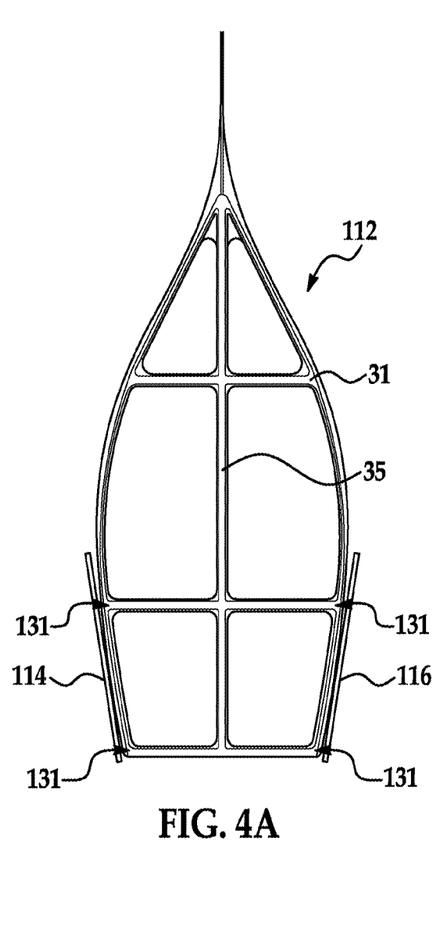
FIG. 4A is a schematic illustration showing another aspect of the invention.
Figure 4B:
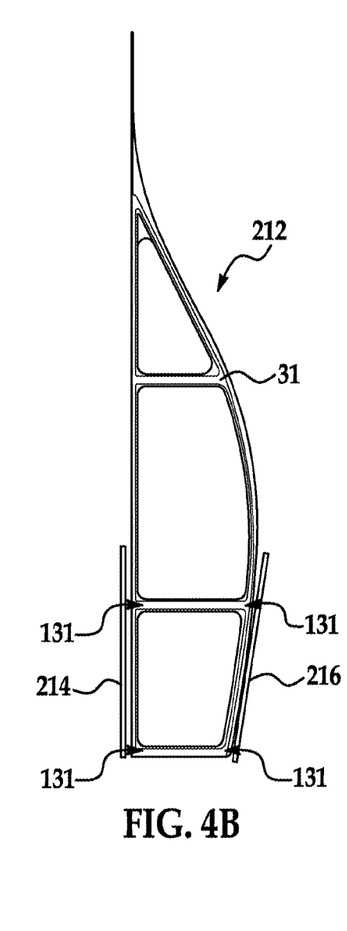
FIG. 4B is a schematic illustration showing yet another aspect of the invention.

In the exemplary embodiment shown, occulter 10 includes twenty petals 12, each interconnected with the adjacent petal 12 so as to block light. The twenty petals of occulter 10 can be further subdivided into two bookend petals 112, an example of bookend petal 112 shown in FIG. 4A, and thirty six half petal portions 212, an example of eighteen of the half petal portions 212 being shown in FIG. 4B, while another eighteen of the half petal portions are mirror images of those shown in FIG. 4B. Each half petal portion 212, when combined with its mirror image, forms a full petal 12. Bookend petal 112 has two hinge lines 114 and 116, while each half petal portion 212 has two hinge lines 214 and 216. Hinge lines 114, 116, 214 and 216 each have two hinges 131 and 132, examples of which can be found at FIGS. 6 and 10. Each hinge 131, 132 is attached to graphite tubular frame 31, with hinge 131 located adjacent inner tubular perimeter section 34 and hinge 132 located radially outward thereof. The center axis of each hinge 131, 132 extends from a radial center 201 of occulter 10. As a consequence, hinges 131 and 132 are located a radial distance from radial center 201 and collectively are on concentric circles about occulter 10.

Figure 6:
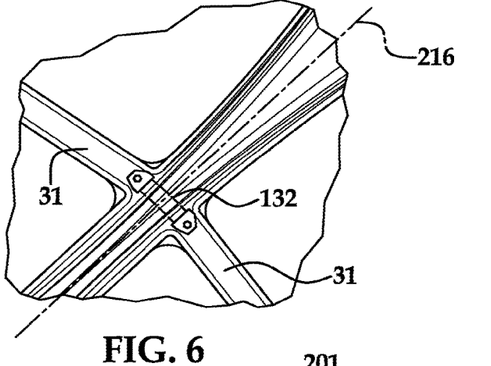
FIG. 6 is a detail view showing a connection detail in accordance with the invention.

Hinges 131, 132 allow rotation of each half petal portion 212 about hinge lines 114, 116, 214 and 216. The arrangement allows for the occulter 10 to be packaged in a single first geometrical plane 233 (FIG. 9) and stowed inside, for example, an Atlas V rocket in a nested manner. In the stowed position, each half petal 212 is located between opposite bookend petals 112. From the stowed position, occulter 10 can be extended to a deployed position in space. Upon deployment, the hinge lines 114, 116, 214 and 216 form radially extending petal joints 114, 116, 214 and 216, two detailed examples are shown at FIGS. 6 and 10. In particular FIG. 10 shows half petal portions 212 forming a single petal 12 in a deployed position. The petal joints are manufactured so as to be dimensionally stable in the environs of space and are capable of sealing and blocking starlight from travelling through the joints 114, 116, 214 and 216.

Figure 7:
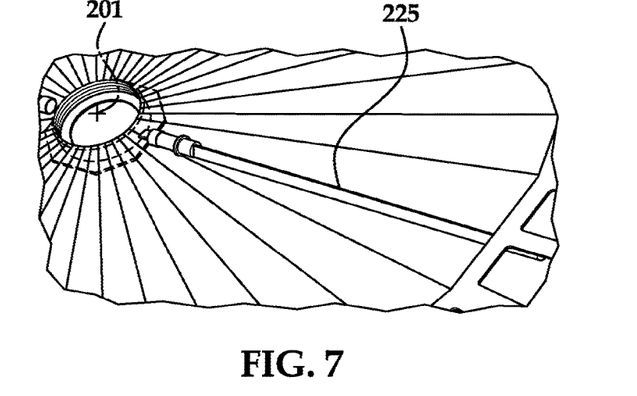
FIG. 7 is a detail view showing one side of the occulter of the invention.
Figure 8:
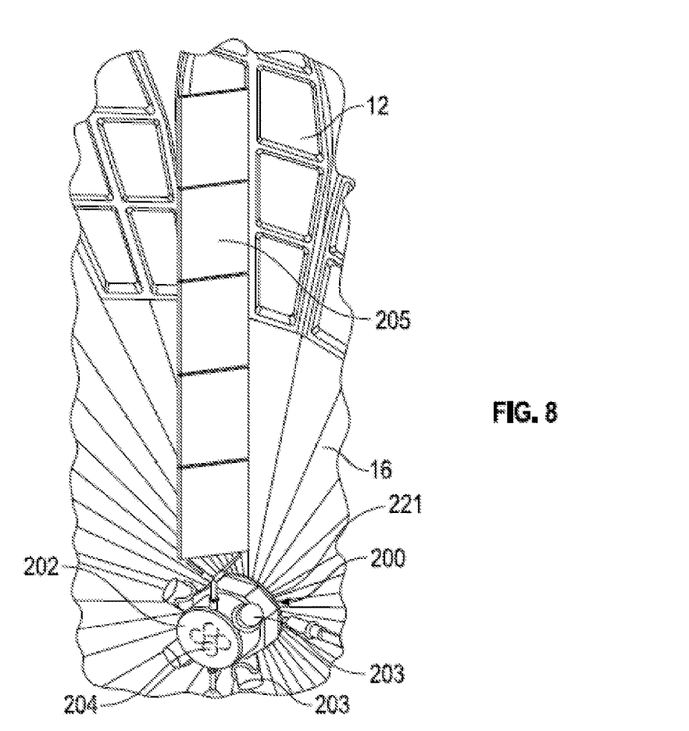
FIG. 8 is a detail view showing the opposite side of the occulter shown in FIG. 7.
Figure 9:
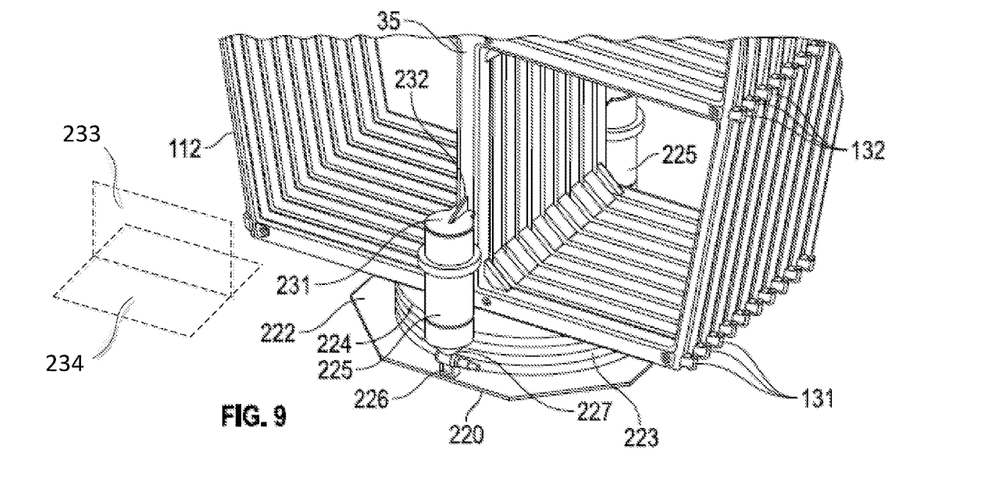
FIG. 9 is a detail view showing the occulter in a stowed position.
Figure 10:
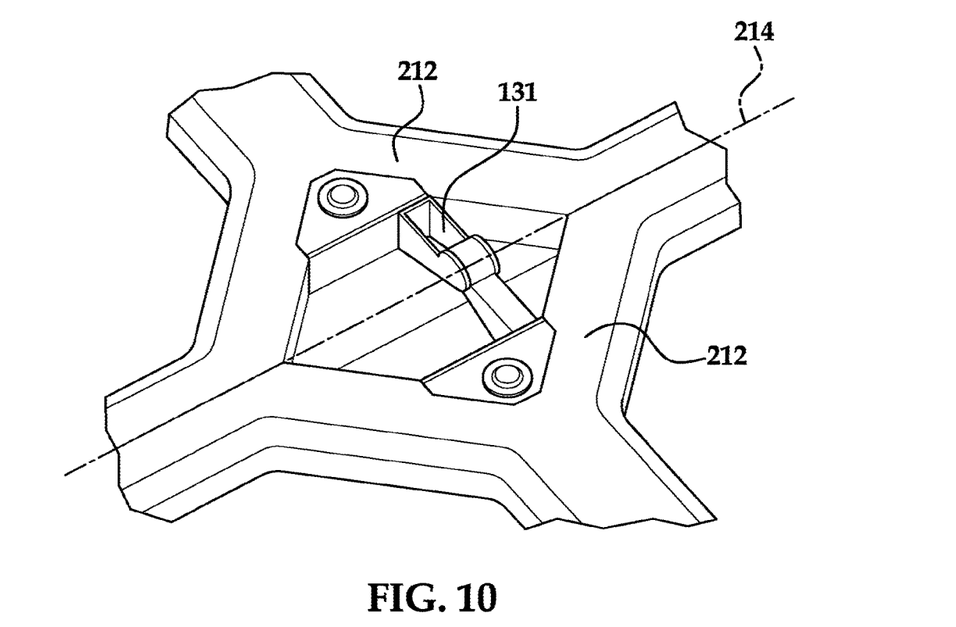
FIG. 10 is a detail view showing yet another aspect of the invention.

Additional details of occulter 10 are shown in FIGS. 7, 8 and 9. Referring to FIG. 8, a detail view of occulter 10 with occulter spacecraft 200 is shown. Spacecraft 200 is located at the radial center 201 of occulter 10 and at an aft end 202 includes ion thrusters 203 for moving occulter from point to point in space and Xe tanks 204 for providing propellant to ion thrusters 203. Reaction wheels (not shown) are also included on spacecraft 10 which push and rotate occulter 10 into proper alignment with the telescope once occulter 10 is in a desired position in space. Once in position, a solar array 205 extends from spacecraft 200. The design has the ability to mitigate (damp out) impulse loading from the spacecraft.

Occulter 10 is attached to spacecraft 200 at a forward end 221. Specifically, occulter 10 includes a base portion 220 having a deployment deck 222 and a cylindrical skirt 223. As best seen in FIG. 9, deployment deck 222 is attached to spacecraft 200 at forward end 221 in a second geometric plane 234 that is generally orthogonal to the first geometric plane 233 in which petals 12 are stowed. Extending from deployment deck 222 is the cylindrical skirt 223 that accommodates center blanket section 16 of occulter 10 in a stowed position. Center blanket section 16 is stowed by folding it in an accordion style within cylindrical skirt 223. Two telescoping deployment masts 225 are mounted to deployment deck 222 via a hinge connection 226 at first end 227. Each deployment mast is rotatable at the hinge connection end 226 and is mounted at a second end 231 to a mast attachment portion 232 on the center stringer tube 35 of each of bookend petals 112.

In the deployed position of FIG. 1, center blanket section 16 is attached to a perimeter edge 224 of cylindrical skirt 223 at a radial interior edge 244 of blanket section 16 by mechanical means so as to form a light-tight seal between perimeter edge 224 and radial interior edge 244. In a like manner, a radial exterior edge 245 of blanket section 16 is attached to each petal 12 at inner tubular perimeter section 34 of tubular frame 31 by mechanical means. The interface between blanket section 16 and petals 12 forms a light-tight seal. In one nonlimiting embodiment of the invention, blanket section 16 is formed of three pliant layers of Kapton, each layer separated by a physical pliable interface (not shown) that creates a void space (not shown) between individual Kapton layers of blanket section 16.

Figure 12:
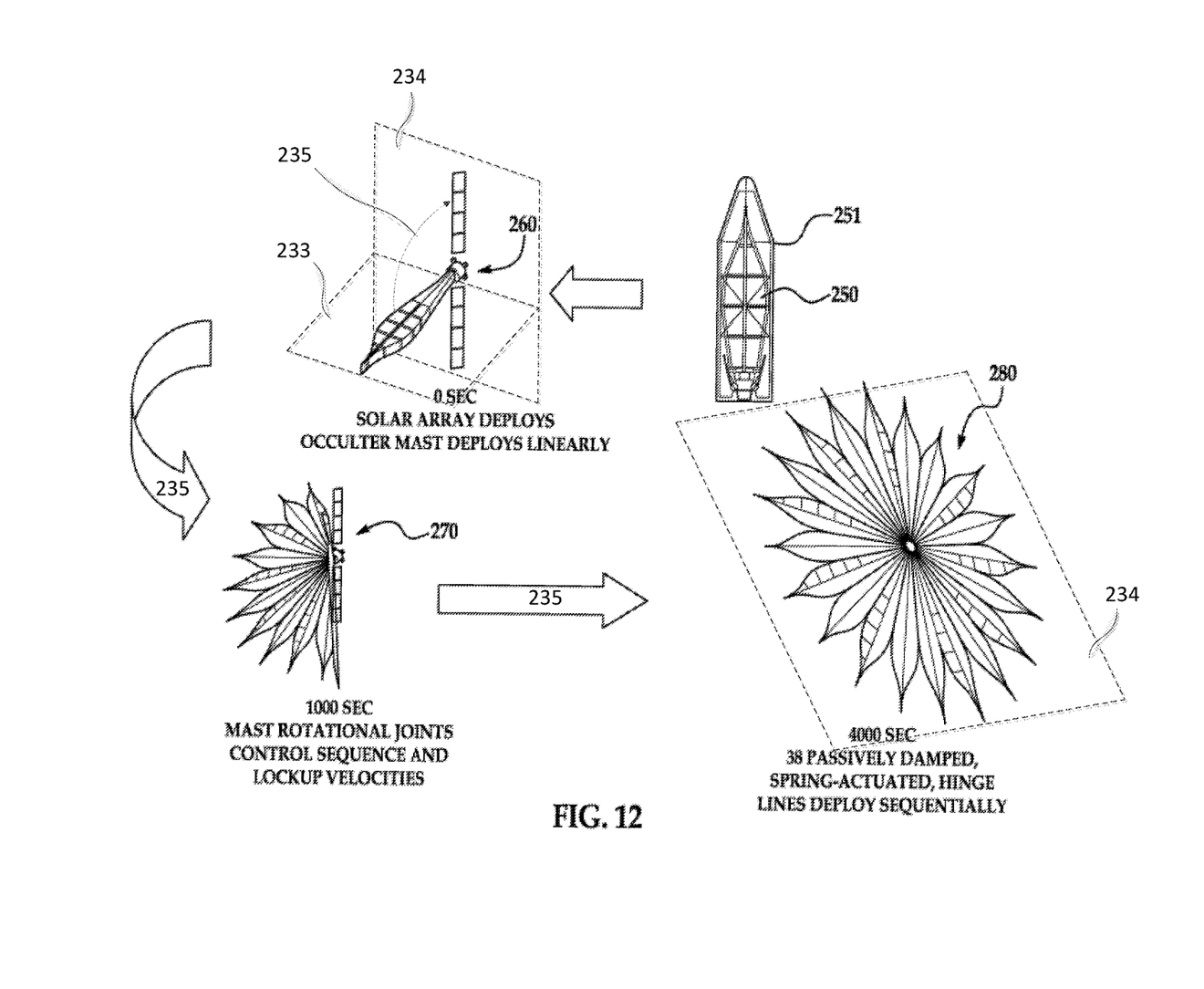
FIG. 12 is a pictorial showing an exemplary embodiment of a method of deploying the occulter of the invention.

Referring now to FIG. 12, an exemplary embodiment of a deployment scheme for occulter 10 is shown. Initially, the occulter is in a stowed position. In the stowed position 250, occulter 10 is folded into a tight package, attached to spacecraft 200 and stowed within a rocket 251, such as an Atlas V rocket. The rocket 251 is jettisoned at some point on the way to the destination for the occulter 10. Thereafter, the solar array 205 deploys and the occulter 10 can be moved by the ion thrusters 203 of spacecraft 200. As seen in FIG. 12 and FIG. 9, the package in its stowed or nested position 250 is bounded by bookend petals 112 with half petal portions stowed therebetween. In the exemplary embodiment shown, eighteen of the half petal portions 212, are nested between bookend petals between center stringer tube 35 and one of the outer tubular sections 32, while the other eighteen of the half petal portions 212 are stowed between the center stringer tube 35 and the other of the outer tubular sections 32. It will of course be appreciated, that any even number of petals 12 can be used in this nested configuration.

Deployment of the occulter 10 begins, after jettisoning the launch fairing 251, from an initial position 250. In the initial position 250, deployment masts 225 are about 90 degrees from the plane of the deployment deck 222. In a nonlimiting embodiment, as deployment begins the two telescoping deployment masts 225 extend axially from a nested position from the deployment deck 222. As such, the two bookend petals 112 (the deploying bookend petal 112) are extended outwardly from deployment deck 222, and begins to draw center blanket section 16 from within cylindrical skirt 223 to a deployed position 280 about parallel to the plane of the deployment deck 222 as shown in 260. During deployment, a number of transitions occur, represented as transitional position 270. As deployment masts rotates 235, the half petals 212 begin to unfold about hinge lines 214, 216, the initial half petal 212 unfolding from adjacent one of the bookend petals 112 such that the hinge line 216 of the initial half petal is coincident with the hinge line 114 of one bookend petal 112. As each half petal 212 unfolds about hinge line 214 it forms a full petal 12, a detail of which is shown in FIG. 10. The effect will be that petals 12 open such that the interior edges resemble a paraboloid that continues to open like a blossoming flower. It will be appreciated that hinges 131 located about hinge line 214 are mounted in alternate positions in order to provide for efficient stowage in rocket 251.

It will be appreciated, that the above description explains one particular deployment scenario of this design. In an alternate embodiment, one deployment mast can be rotated at a time, the effect will be to reduce the energy being released at any time allowing for a more controlled deployment. Additional control is possible by adding simple camming mechanisms between the intra-petal hinge lines 114, 115, 216 such that the petal deployment is sequenced. Of course when fully opened, the occulter has two planar surfaces that form an effective light shield. In a final position 280 of FIG. 12, occulter 10 is shown schematically and fully deployed.

The above describes an on-orbit deployable occulter 10 that is lightweight. In the embodiments shown, a low CTE graphite epoxy layup is used to create a precision outer surface occulting edge 14 on a rigid petal-shaped plate 12. The petals 12 are supported by a graphite epoxy frame 31 sized to provide the necessary on orbit rigidity and dynamic stiffness for maneuvering the occulter into a position with respect to a space-based telescope. Multiple layers of Kapton, separated by a void space at a predetermined distance, provide a low-mass, light occulting petals 12 that are micrometeorite resistant, and a center blanket section 16 that has the same properties. The Kapton layers are supported by the frame 31 and may be additionally supported by lightweight Kapton frames to predetermined distance between Kapton layers an to provide greater structural rigidity for the individual Kapton panels. This prevents the Kapton layers from deforming the petal 12 or occulter 10 while exposed to the temperature extremes of space.

Figure 11:
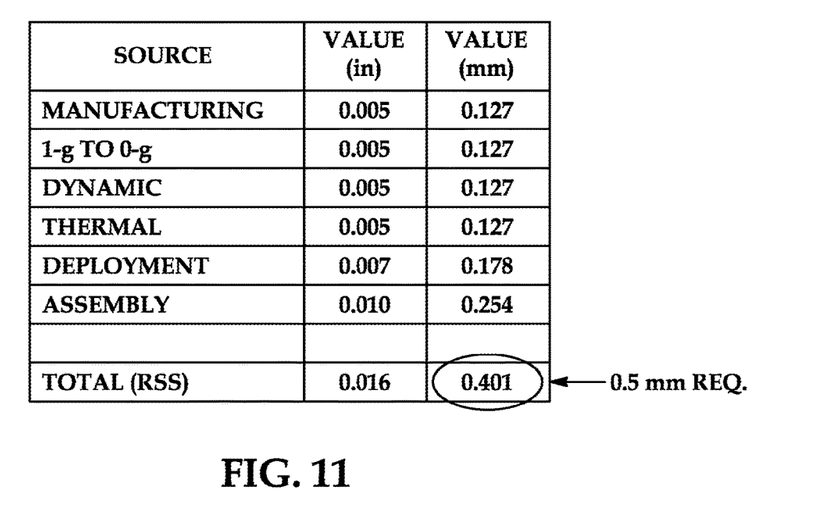
FIG. 11 is a chart showing the dimensional stability of the invention.

The invention provides a dimensionally stable and dynamically stiff occulter 10 in the extreme conditions of space under zero gravity. In addition, the invention can remain stable at the temperature extremes of various orbits such as low earth, lagrangian, and fly away, even after orbital deployment and the mechanical forces of deployment under zero gravity. The occulter 10 disclosed herein is capable of being made in dimensions exceeding 40 meters in diameter, yet as shown in the table of FIG. 11, total dimensional tolerance variation does not exceed about 0.4 meters.

Of course it will be appreciated that the invention is not limited to the embodiments described. For instance, one skilled in the art may determine that material substitutions, in whole or in part, may achieve acceptable dimensional stability and dynamic stiffness. It is intended to include all such variations within the scope of the invention.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A method of deploying a space based occulter from a stowed position to a deployed position comprising:
    providing a plurality of petals in a first position parallel to a first plane and attached to a base portion via a blanket section, said blanket section having an interior perimeter edge attached to said base portion and an exterior perimeter edge attached to said plurality of petals, said base portion being parallel to a second plane generally orthogonal to said first plane, wherein said plurality of petals, when in the stowed position, are folded along respective hinges in a nested configuration bounded by two bookend petals, each of said plurality of petals laying flat against an adjacent petal and being oriented in a same direction relative to said base portion when in said nested configuration;
    extending at least two of said petals away from said base portion;
    rotating said at least two petals from the first position parallel to said first plane in said stowed position to said deployed position generally parallel to said second plane; and
    transitioning the blanket section from a stowed position at said base portion to said deployed position generally parallel to said second plane.

2. The method of claim 1, including sequentially extending said at least two of said petals away from said base portion.

3. A method of deploying a space based occulter from a stowed position to a deployed position comprising:
    providing a plurality of petals attached to a base portion via a blanket section, said blanket section having an interior perimeter edge attached to said base portion and an exterior perimeter edge attached to said plurality of petals, the plurality of petals being, when in the stowed position, folded along respective hinges in a nested configuration bounded by two bookend petals, each of said plurality of petals being orientated in a same direction relative to said base portion when in the nested configuration;
    extending at least two of said petals away from said base portion;
    rotating said at least two petals from being parallel to a first plane in said stowed position to said deployed position generally parallel to a second plane; and
    transitioning the blanket section from a stowed position at said base portion to said deployed position generally parallel to said second plane.

4. The method of claim 3, wherein said base portion is parallel to said second plane generally orthogonal to said first plane.

5. The method of claim 3, wherein each of said plurality of petals laying flat against an adjacent petal in said stowed position, each of said petals hingedly connected to an adjacent petal.

6. The method of claim 3, wherein said blanket section extends radially from said base portion.

7. The method of claim 3, wherein said petals extend radially from said base portion, each of said petals being hingedly connected to an adjacent petal.

8. The method of claim 3, wherein each of said petals includes at least one panel for blocking starlight, said at least one panel for blocking starlight including at least two layers of Kapton over said panel, each of said layers having a void space therebetween.

9. The method of claim 3, wherein each of said plurality of petals includes a petal frame and a structural frame attached to said petal frame.

10. The method of claim 9, wherein each of said petals includes at least one panel for blocking starlight, wherein each of said petals includes an interior portion attached to said structural frame, said interior portion including said at least one panel for blocking starlight.

11. The method of claim 10, wherein said interior portion includes a plurality of panels for blocking starlight.

12. The method of claim 3, wherein each of said plurality of petals includes starlight blocking radially extending joints therebetween.

13. The method of claim 12, wherein at least one of said plurality of petals having a first portion and a second portion, said first portion and said second portion hingedly connected at a radially extending petal joint therebetween.

14. The method of claim 13, wherein said first portion includes an interior portion having at least one panel for blocking starlight.

15. The method of claim 3, wherein said blanket section is comprised of a plurality of layers, each said layer having a void space therebetween.

\* \* \* \* \*